United States Patent
Beckman et al.

(10) Patent No.: US 12,513,735 B2
(45) Date of Patent: Dec. 30, 2025

(54) PRIORITIZING UPLINK TRANSMISSIONS BETWEEN SUBSCRIPTIONS

(71) Applicant: QUALCOMM Incorporated, San Diego, CA (US)

(72) Inventors: James Beckman, La Jolla, CA (US); Enoch Shiao-Kuang Lu, San Diego, CA (US); Aamod Khandekar, San Diego, CA (US); Reza Shahidi, San Diego, CA (US); Krishna Chaitanya Mukkera, San Diego, CA (US); Lan Lan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 357 days.

(21) Appl. No.: 17/654,344

(22) Filed: Mar. 10, 2022

(65) Prior Publication Data
US 2022/0295505 A1   Sep. 15, 2022

Related U.S. Application Data

(60) Provisional application No. 63/159,865, filed on Mar. 11, 2021.

(51) Int. Cl.
*H04W 72/56*   (2023.01)
*H04L 5/14*   (2006.01)
(Continued)

(52) U.S. Cl.
CPC ........... *H04W 72/56* (2023.01); *H04L 5/1469* (2013.01); *H04W 72/0453* (2013.01); *H04W 72/23* (2023.01); *H04W 72/51* (2023.01)

(58) Field of Classification Search
CPC . H04W 72/56; H04W 72/0453; H04W 72/23; H04W 72/51; H04L 5/1469
See application file for complete search history.

(56) References Cited

U.S. PATENT DOCUMENTS

2015/0004973 A1*  1/2015  Gude ............... H04W 52/0216
                                                              455/435.2
2018/0368160 A1*  12/2018  Kunt .................. H04W 72/23
(Continued)

FOREIGN PATENT DOCUMENTS

CN   110139383 A  *  8/2019  .......... H04L 5/0055
CN   113950157 A  *  1/2022
(Continued)

OTHER PUBLICATIONS

Huawei, et al., "Views on Rel-17 Package", 3GPP Draft, 3GPP TSG RAN Meeting #86, RP-193098, 3rd Generation Partnership Project (3GPP), Mobile Competence Centre, 650, Route Des Lucioles, F-06921 Sophia-Antipolis Cedex, France, vol. TSG RAN, No. Sitges, Spain, Dec. 9, 2019-Dec. 12, 2019, Dec. 10, 2019, (Dec. 10, 2019), XP051838813, 9 Pages, Retrieved from the Internet: URL: https://ftp.3gpp.org/Meetings_3GPP_SYNC/RAN/Docs/RP-193098.zipRP-193098 Huawei Views on Rel-17 Package.pptx [Retrieved on Dec. 10, 2019] The Whole Document.
(Continued)

*Primary Examiner* — Kenny S Lin
(74) *Attorney, Agent, or Firm* — Harrity & Harrity, LLP

(57) ABSTRACT

Various aspects of the present disclosure generally relate to wireless communication. In some aspects, a user equipment (UE) may perform, to a first base station and via a first radio frequency (RF) chain, at least a portion of a first uplink transmission associated with a first priority. The UE may receive, from the first base station or from a second base station and during the first uplink transmission, a physical downlink control channel (PDCCH) grant for a second uplink transmission associated with a second priority higher than the first priority. The UE may cancel a remaining portion of the first uplink transmission based at least in part on receiving the PDCCH grant for the second uplink transmission. The UE may perform, to the first base station or to (Continued)

the second base station and via a second RF chain, the second uplink transmission. Numerous other aspects are described.

29 Claims, 12 Drawing Sheets

(51) Int. Cl.
*H04W 72/0453* (2023.01)
*H04W 72/23* (2023.01)
*H04W 72/51* (2023.01)

(56) References Cited

U.S. PATENT DOCUMENTS

| | | | | |
|---|---|---|---|---|
| 2019/0075589 | A1* | 3/2019 | Jeon | H04W 72/0453 |
| 2019/0207737 | A1* | 7/2019 | Babaei | H04B 7/0617 |
| 2019/0215717 | A1* | 7/2019 | Lee | H04W 72/21 |
| 2019/0289638 | A1* | 9/2019 | Kung | H04W 74/0833 |
| 2019/0327755 | A1* | 10/2019 | Xiong | H04L 5/0046 |
| 2020/0221311 | A1* | 7/2020 | Liu | H04L 5/0087 |
| 2021/0127279 | A1* | 4/2021 | Jiang | H04W 72/12 |
| 2021/0258981 | A1* | 8/2021 | Hosseini | H04W 72/566 |
| 2021/0259018 | A1* | 8/2021 | Hosseini | H04W 72/0453 |
| 2021/0314938 | A1* | 10/2021 | Kim | H04L 5/001 |
| 2021/0392685 | A1* | 12/2021 | Myung | H04W 72/1263 |
| 2022/0039100 | A1* | 2/2022 | Yoshioka | H04W 72/56 |
| 2022/0053459 | A1* | 2/2022 | Shimezawa | H04W 72/1268 |
| 2022/0132533 | A1* | 4/2022 | Taherzadeh Boroujeni | H04B 7/2656 |
| 2022/0150882 | A1* | 5/2022 | Gou | H04W 72/23 |
| 2022/0248422 | A1* | 8/2022 | Lu | H04W 72/1268 |
| 2023/0047645 | A1* | 2/2023 | Gou | H04L 1/0027 |
| 2024/0097827 | A1* | 3/2024 | Lee | H04W 4/08 |

FOREIGN PATENT DOCUMENTS

| | | | | |
|---|---|---|---|---|
| EP | 3764677 A1 | 1/2021 | | |
| WO | WO-2020102151 A2 | * 5/2020 | | H04L 5/0044 |
| WO | WO-2021098496 A1 | * 5/2021 | | H04L 5/001 |

OTHER PUBLICATIONS

Huawei, et al., "Overview of Rel-17 Work Areas for NR and LTE", 3GPP TSG RAN Meeting #84, RP-191486, Overview of Rel-17 Work Areas for NR and LTE Final (WAS RP-191007), 3rd Generation Partnership Project (3GPP), Mobile Competence Centre, 650, Route Des Lucioles, F-06921, Sophia-Antipolis, vol. TSG RAN, No. Newport Beach, USA, Jun. 3, 2019-Jun, 6, 2019, Jun. 4, 2019 (Jun. 4, 2019), 22 Pages, May 29, 2019 (May 29, 2019, XP051748412, Retrieved from the Internet: URL: http://www.3gpp.org/ftp/Meetings%5F3GPP%5FSYNC/RAN/Docs/RP%2D191486%2Ezip [retrieved on Jun. 4, 2019], Section "Mobility Enhancements, in Particular p. 13, the Paragraphs Below Figure 3, the whole document, Section Mobility Enhancements", [retrieved on May 29, 2019] p. 12-p. 13, p. 16-p. 18, p. 16-p. 17, the whole document.
International Search Report and Written Opinion—PCT/US2022/071101—ISA/EPO—May 30, 2022.
Sony: "Considerations on UL Intra-UE Tx Multiplexing", 3GPP TSG RAN WG1 #96, 3GPP Draft, R1-1902182—REL-16 URLLC—INTRA-UE MUX V00, 3rd Generation Partnership Project (3GPP), Mobile Competence Centre, 650, Route Des Lucioles, F-06921, Sophia-Antipolis Cedex, France, vol. RAN WG1, No. Athens, Greece, Feb. 25, 2019-Mar. 1, 2019, Feb. 16, 2019 (Feb. 16, 2019), XP051599877, 9 Pages, Retrieved from the Internet: URL: http://www.3gpp.org/ftp/tsg%5Fran/WG1%5FRL1/TSGR1%5F96/Docs/R1%2D1902182%2Ezip [retrieved on Feb. 16, 2019] Proposal 16, p. 7-p. 7.

* cited by examiner

PRIORITIZING UPLINK TRANSMISSIONS BETWEEN SUBSCRIPTIONS

CROSS-REFERENCE TO RELATED APPLICATION

This Patent Applications claims priority to U.S. Provisional Patent Application No. 63/159,865, filed on Mar. 11, 2021, entitled "PRIORITIZING UPLINK TRANSMISSIONS BETWEEN SUBSCRIPTIONS," and assigned to the assignee hereof. The disclosure of the prior Applications is considered part of and is incorporated by reference into this Patent Applications.

FIELD OF THE DISCLOSURE

Aspects of the present disclosure generally relate to wireless communication and to techniques and apparatuses for prioritizing uplink transmissions between subscriptions.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a UE includes performing, to a first base station and via a first radio frequency (RF) chain associated with a first subscription, at least a portion of a first uplink transmission associated with a first priority; receiving, from the first base station or from a second base station and during the first uplink transmission, a physical downlink control channel (PDCCH) grant for a second uplink transmission associated with a second priority higher than the first priority; canceling a remaining portion of the first uplink transmission associated with the first priority based at least in part on receiving the PDCCH grant for the second uplink transmission associated with the second priority higher than the first priority; and performing, to the first base station or to the second base station and via a second RF chain associated with a second subscription, the second uplink transmission.

In some aspects, a UE for wireless communication includes a memory and one or more processors, coupled to the memory, configured to: perform, to a first base station and via a first RF chain associated with a first subscription, at least a portion of a first uplink transmission associated with a first priority; receive, from the first base station or from a second base station and during the first uplink transmission, a PDCCH grant for a second uplink transmission associated with a second priority higher than the first priority; cancel a remaining portion of the first uplink transmission associated with the first priority based at least in part on receiving the PDCCH grant for the second uplink transmission associated with the second priority higher than the first priority; and perform, to the first base station or to the second base station and via a second RF chain associated with a second subscription, the second uplink transmission.

In some aspects, a non-transitory computer-readable medium storing a set of instructions for wireless communication includes one or more instructions that, when executed by one or more processors of a UE, cause the UE to: perform, to a first base station and via a first RF chain associated with a first subscription, at least a portion of a first uplink transmission associated with a first priority; receive, from the first base station or from a second base station and during the first uplink transmission, a PDCCH grant for a second uplink transmission associated with a second priority higher than the first priority; cancel a remaining portion of the first uplink transmission associated with the first priority based at least in part on receiving the PDCCH grant for the second uplink transmission associated with the second priority higher than the first priority; and perform, to the first base station or to the second base station and via a second RF chain associated with a second subscription, the second uplink transmission.

In some aspects, an apparatus for wireless communication includes means for performing, to a first base station and via a first RF chain associated with a first subscription, at least a portion of a first uplink transmission associated with a first priority; means for receiving, from the first base station or from a second base station and during the first uplink transmission, a PDCCH grant for a second uplink transmission associated with a second priority higher than the first priority; means for canceling a remaining portion of the first uplink transmission associated with the first priority based at least in part on receiving the PDCCH grant for the second uplink transmission associated with the second priority higher than the first priority; and means for performing, to the first base station or to the second base station and via a second RF chain associated with a second subscription, the second uplink transmission.

Aspects generally include a method, apparatus, system, computer program product, non-transitory computer-readable medium, user equipment, network entity, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
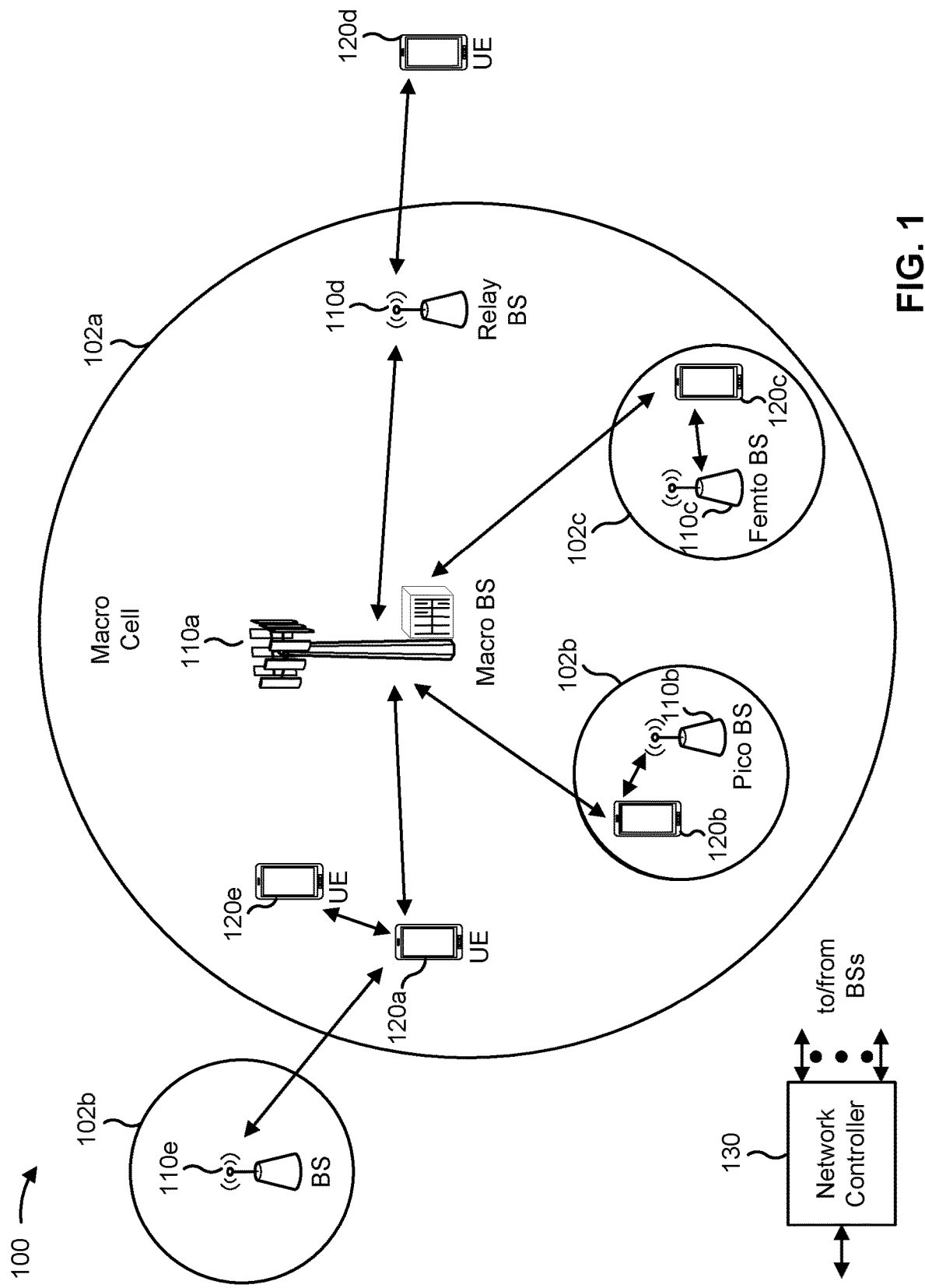
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some aspects, the term "base station" (e.g., the base station 110) or "network entity" may refer to an aggregated base station, a disaggregated base station, an integrated access and backhaul (IAB) node, a relay node, and/or one or more components thereof. For example, in some aspects, "base station" or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station" or "network entity" may refer to one device configured to perform one or more functions, such as those described herein in connection with the base station 110. In some aspects, the term "base station" or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" or "network entity" may refer to any one or more of those different devices. In some aspects, the term "base station" or "network entity" may refer to one or more virtual base stations and/or one or more virtual base station functions. For example, in some aspects, two or more base station functions may be instantiated on a single device. In some aspects, the term "base station" or "network entity" may refer to one of the base station functions and not another. In this way, a single device may include more than one base station.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

As indicated above, FIG. 1 is provided as an example. Other examples may differ from what is described with regard to FIG. 1.

Figure 2:
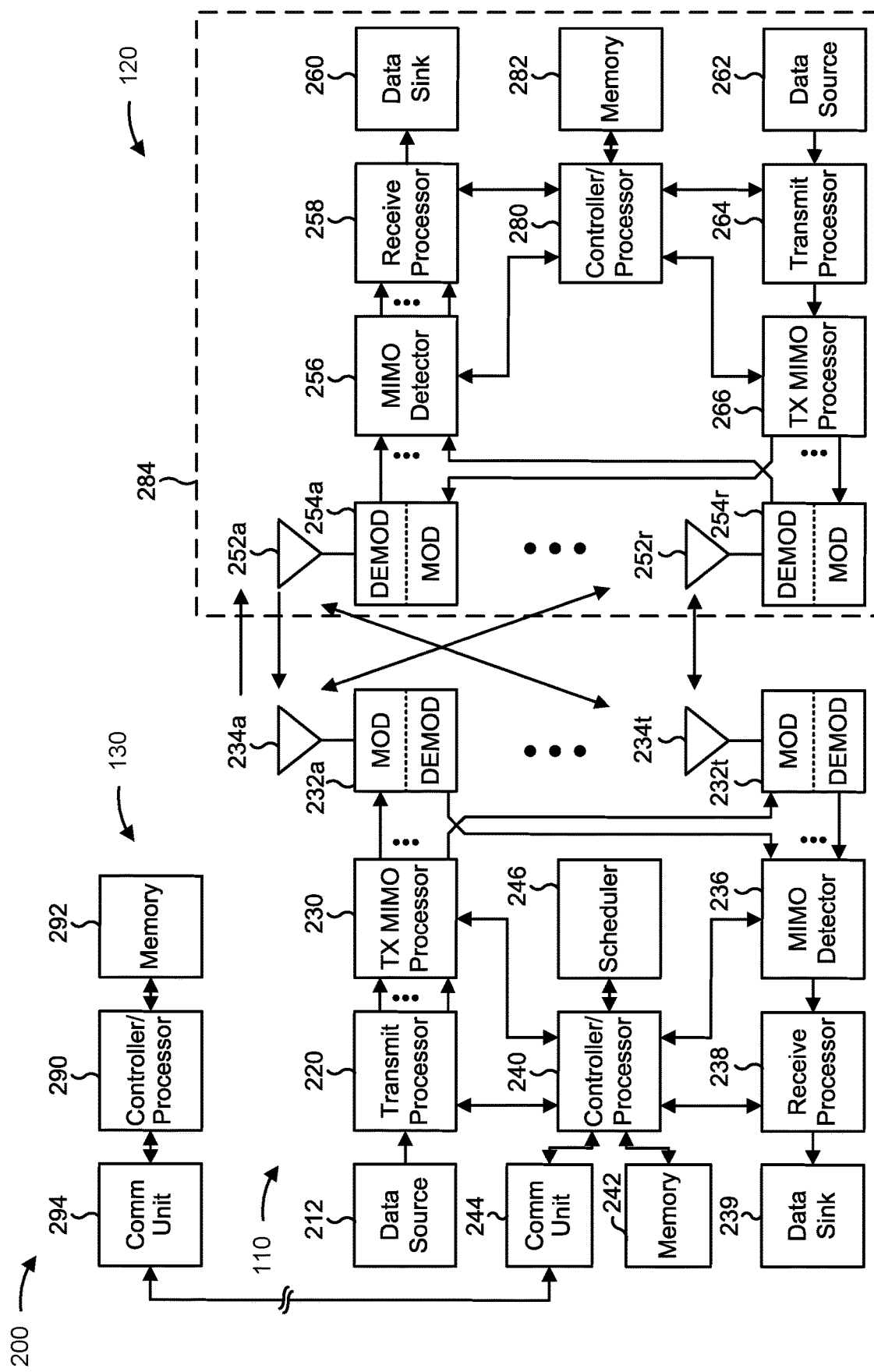
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-11).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem (s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-11).

The controller/processor 240 of the base station 110, the controller/processor 280 of the UE 120, and/or any other component(s) of FIG. 2 may perform one or more techniques associated with prioritizing uplink transmissions between subscriptions, as described in more detail elsewhere herein. For example, the controller/processor 240 of the base station 110, the controller/processor 280 of the UE 120, and/or any other component(s) of FIG. 2 may perform or direct operations of, for example, process 1100 of FIG. 11, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1100 of FIG. 11, and/or other processes as described herein. In some examples, executing instructions may include running the instructions, converting the instructions, compiling the instructions, and/or interpreting the instructions, among other examples.

In some aspects, a UE (e.g., UE 120) includes means for performing, to a first base station and via a first RF chain associated with a first subscription, at least a portion of a first uplink transmission associated with a first priority; means for receiving, from the first base station or from a second base station and during the first uplink transmission, a PDCCH grant for a second uplink transmission associated with a second priority higher than the first priority; means for canceling a remaining portion of the first uplink transmission associated with the first priority based at least in part on receiving the PDCCH grant for the second uplink transmission associated with the second priority higher than the first priority; and/or means for performing, to the first base station or to the second base station and via a second RF chain associated with a second subscription, the second uplink transmission. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE includes means for switching, based at least in part on a start of the remaining portion of the first uplink transmission that is canceled, to the second uplink transmission on the second RF chain.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

A UE that supports dual subscriber identification module (SIM) dual-active (DSDA) may include two SIM cards that have the capability to operate in two separate networks. The two SIM cards may be associated with two separate subscriptions. For example, each SIM card may store network-specific information used to authenticate and identify subscribers on a specific network. A first SIM card may be associated with a first subscription and a second SIM card may be associated with a second subscription. The first subscription may be associated with a first network operator and the second subscription may be associated with a second network operator.

The UE may include a first RF chain associated with the first subscription. The first RF chain may perform uplink transmissions to a first base station (or BS). The UE may include a second RF chain associated with the second subscription. The second RF chain may perform uplink transmissions to a second base station. The first base station may be associated with a first network and the second base station may be associated with a second network. In some cases, the first RF chain and the second RF chain may perform transmissions to a same base station in a network.

In some cases, a UE may be performing an uplink transmission. The uplink transmission may be associated with a low priority (e.g., an uplink transmission associated with a gaming application). The low priority may be a first priority. While the uplink transmission is being performed, the UE may need to perform an uplink transmission associated with a high priority (e.g., voice data). The high priority may be a second priority higher than the first priority. Since the UE may utilize transmit sharing, the UE may have to wait until the low priority uplink transmission is finished until performing the high priority uplink transmission. However, the UE may receive a grant to perform the high priority uplink transmission in a corresponding subframe, but that subframe may still coincide with the low priority uplink transmission. As a result, the high priority uplink transmission may be unable to be performed due to the ongoing low priority uplink transmission.

In various aspects of techniques and apparatuses described herein, a UE may perform, to a first base station and via a first RF chain associated with a first subscription, at least a portion of a first uplink transmission associated with a low priority. The UE may receive, from the first base station or from a second base station and during the first uplink transmission, a PDCCH grant for a second uplink transmission associated with a high priority. The UE may cancel a remaining portion of the first uplink transmission associated with the low priority based at least in part on receiving the PDCCH grant for the second uplink transmission associated with the high priority. The UE may perform, to the first base station or to the second base station and via a second RF chain associated with a second subscription, the second uplink transmission. In some aspects, the UE may switch, based at least in part on a start of the remaining portion of the first uplink transmission that is canceled, to the second uplink transmission on the second RF chain. In some aspects, the UE may switch to the second uplink transmission based at least in part on a switched uplink mechanism or a sounding reference signal (SRS) carrier switching mechanism. The switched uplink mechanism or the SRS carrier switching carrier mechanism may enable the UE to switch to the second RF chain in time to perform the second uplink transmission in the uplink grant indicated by the PDCCH. In other words, the switched uplink mechanism or the SRS carrier switching carrier mechanism may enable the UE to switch fast enough to perform the second uplink transmission in the uplink grant indicated by the PDCCH.

Figure 3:
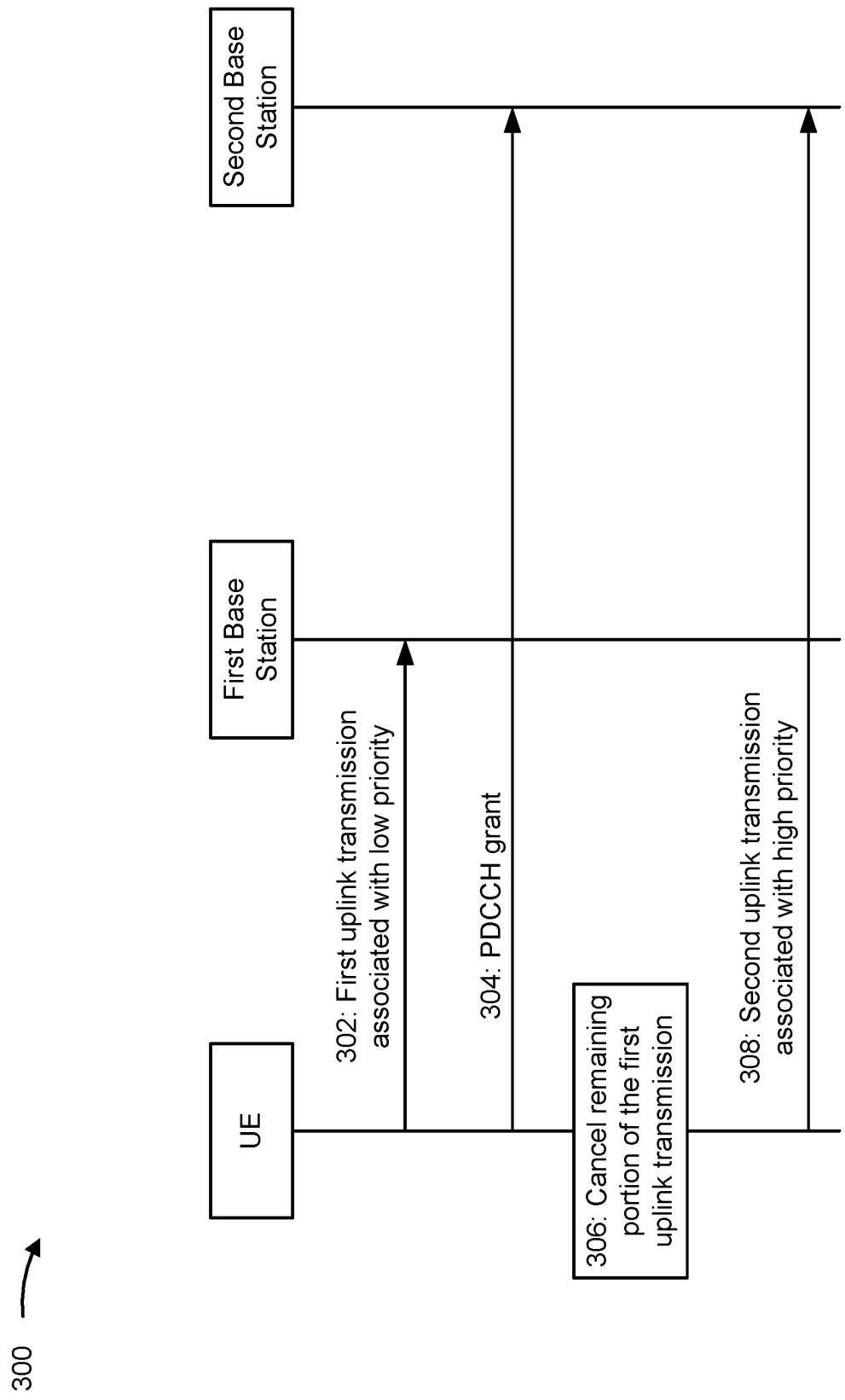
FIGS. 3-10 are diagrams illustrating examples associated with prioritizing uplink transmissions between subscriptions, in accordance with the present disclosure.

FIG. 3 is a diagram illustrating an example 300 of prioritizing uplink transmissions between subscriptions, in accordance with the present disclosure. As shown in FIG. 3, example 300 includes communication between a UE (e.g., UE 120), a first base station (e.g., base station 110a), and a second base station (e.g., base station 110e). In some aspects, the UE, the first base station, and the second base station may be included in a wireless network such as wireless network 100.

As shown by reference number 302, the UE may perform, to the first base station and via a first RF chain associated with a first subscription, at least a portion of a first uplink transmission associated with a low priority. The low priority may be a first priority. The first uplink transmission may be a physical uplink shared channel (PUSCH) transmission.

As shown by reference number 304, the UE may receive, from the first base station or from the second base station and during the first uplink transmission, a physical downlink control channel (PDCCH) grant for a second uplink transmission associated with a high priority. The high priority may be a second priority higher than the first priority. The second uplink transmission may be a PUSCH transmission. In some aspects, the first base station may be associated with a first network and the second base station may be associated with a second network.

As shown by reference number 306, the UE may cancel a remaining portion of the first uplink transmission associated with the low priority based at least in part on receiving the PDCCH grant for the second uplink transmission associated with the high priority. In some aspects, a quantity of symbols between the PDCCH grant and a start of the second uplink transmission may correspond to a minimum timeline for frequency division duplexing (FDD), or to a minimum timeline for time division duplexing (TDD).

As shown by reference number 308, the UE may perform, to the first base station or to the second base station and via a second RF chain associated with a second subscription, the second uplink transmission. The first uplink transmission may not overlap in time with the second uplink transmission based at least in part on transmit sharing between the first RF chain and the second RF chain.

In some aspects, the first RF chain and the second RF chain may be associated with common uplink radio frequency resources that are shared between the first RF chain and the second RF chain. In some aspects, the first subscription and the second subscription may be associated with a single band. In some aspects, the first subscription may be associated with a first band and the second subscription may be associated with a second band.

In some aspects, the UE may switch, based at least in part on a start of the remaining portion of the first uplink transmission that is canceled, to the second uplink transmission on the second RF chain. In some aspects, the switching is based at least in part on a switched uplink mechanism. Alternatively, in some aspects, the switching may be based at least in part on an SRS carrier switching mechanism. The switched uplink mechanism and/or the SRS carrier switching mechanism may allow the UE to switch between the first RF chain performing the first uplink transmission to the second RF chain to perform the second uplink transmission in a relatively low period of time.

In some aspects, the UE may perform the first uplink transmission and the second uplink transmission based at least in part on an uplink MIMO capability of the UE. The uplink MIMO capability may support two transmissions for one carrier and may be configured to provide one uplink transmission per subscription. In some aspects, the UE may perform the first uplink transmission and the second uplink transmission based at least in part on an uplink carrier aggregation capability of the UE. The uplink carrier aggregation capability may support one transmission per carrier and may be configured to provide one uplink transmission per subscription.

In some aspects, the first uplink transmission may be based at least in part on FDD and the second uplink transmission may be based at least in part on TDD. In some aspects, the first uplink transmission may be based at least in part on FDD and the second uplink transmission may be based at least in part on FDD. In some aspects, the first uplink transmission may be based at least in part on TDD and the second uplink transmission may be based at least in part on TDD.

As indicated above, FIG. 3 is provided as an example. Other examples may differ from what is described with regard to FIG. 3.

In some aspects, a UE that supports dual uplink connections with two subscriptions may employ transmit sharing, in which common uplink RF resources may be shared among the two subscriptions. Transmit sharing may be employed to reduce circuit board costs, since a quantity of RF components may be reduced when the RF components are shared between the two subscriptions. For example, two RF chains may share an amplifier (e.g., a power amplifier), rather than each RF chain having a dedicated amplifier. Further, transmit sharing may be employed as an alternative to simultaneous uplink transmissions with power backoff, as in some cases, drastic reductions to output power of one uplink transmission may not feasible.

In some aspects, during transmit sharing, shared RF resources may be switched between uplink transmissions. The shared RF resources may include amplifiers (e.g., power amplifiers), phase-locked loops (PLLs), and/or filters. For example, a first uplink transmission may use the shared RF resources, and then a second uplink transmission, which may occur later in time as compared to the first uplink, may also use the shared RF resources. As a result, a quantity of RF resources may be reduced. In some aspects, after the first uplink transmission, the shared RF resources may be reconfigured to be used with the second uplink transmission. The shared RF resources may be reconfigured using switches and other suitable techniques.

In some aspects, transmit sharing may be associated with a same band or different bands. For example, a first uplink transmission and a second uplink transmission may both be associated with the same band (e.g., N78 band). Alternatively, the first uplink transmission may be associated with a first band and the second uplink transmission may be associated with a second band.

Figure 4:
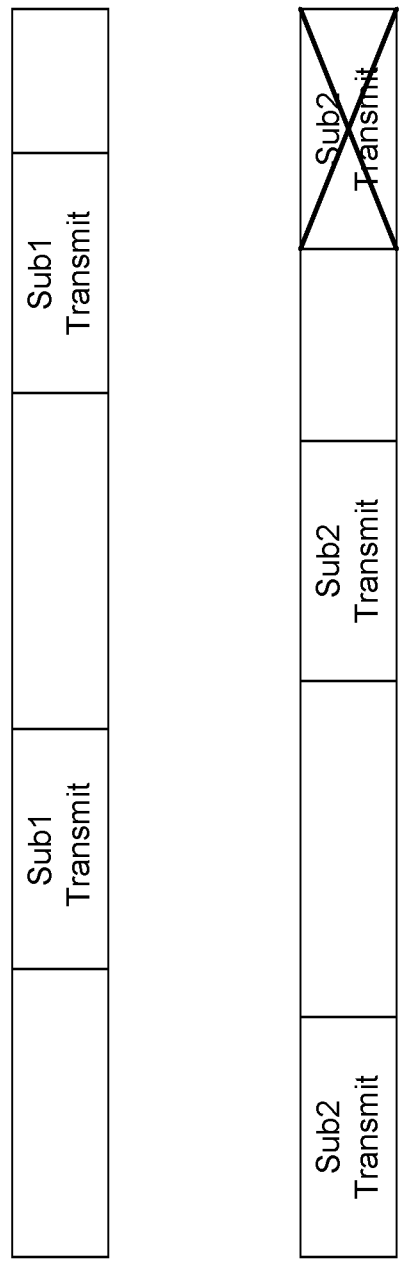

FIG. 4 is a diagram illustrating an example 400 of prioritizing uplink transmissions between subscriptions, in accordance with the present disclosure.

As shown in FIG. 4, uplink transmissions associated with a first subscription (sub1) may be performed over a period of time. The first subscription may be associated with a first RF chain. Uplink transmissions associated with a second subscription may be performed over the period of time. The second subscription (sub2) may be associated with a second RF chain. In some cases, an uplink transmission associated with the second subscription may at least partially overlap in time with an uplink transmission associated with the first subscription. In this case, the uplink transmission associated with the second subscription may be canceled based at least in part on a presence of the first uplink transmission. For example, the first uplink transmission may be a high priority transmission and the second uplink transmission may be a low priority transmission, so the second uplink transmission may be canceled.

As indicated above, FIG. 4 is provided as an example. Other examples may differ from what is described with regard to FIG. 4.

Figure 5:
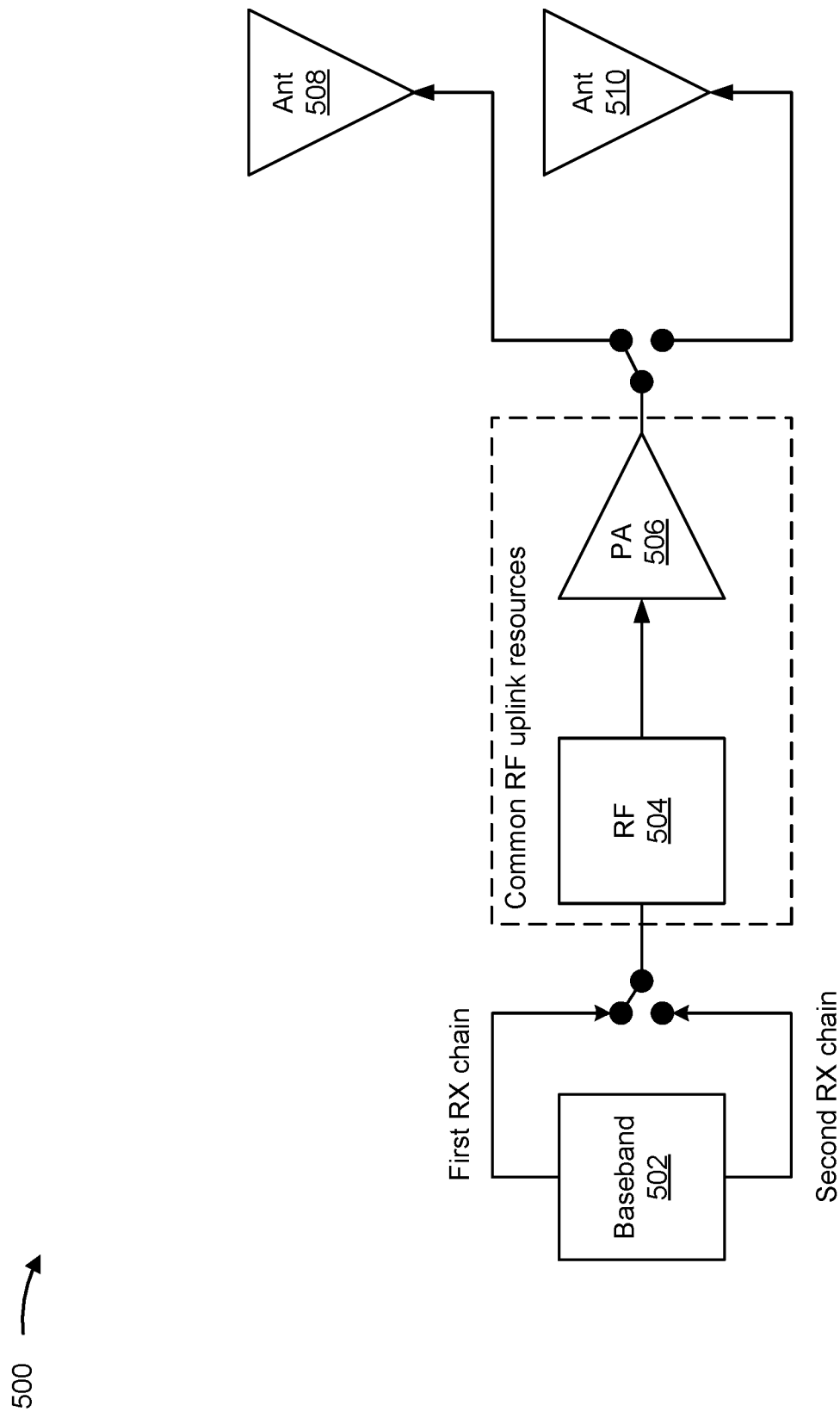

FIG. 5 is a diagram illustrating an example 500 of prioritizing uplink transmissions between subscriptions, in accordance with the present disclosure.

As shown in FIG. 5, a UE may include a baseband component 502. The baseband component 502 may be communicatively coupled to a first RF chain and to a second RF chain. The first RF chain and the second RF chain may be communicatively coupled to common RF uplink resources. The common RF uplink resources may include a plurality of components, such as RF components 504 and/or amplifiers 506 (e.g., power amplifiers, low-noise amplifiers). The first RF chain may be communicatively coupled to a first antenna 508. The second RF chain may be communicatively coupled to a second antenna 510. In some aspects, switches may enable the first RF chain and the second RF chain to share the common RF uplink resources. For example, based at least in part on switching, the first RF chain may obtain access to the common RF uplink resources for a period of time, and the second RF chain may subsequently obtain access to the common RF uplink resources for a subsequent period of time.

In some aspects, the first RF chain may be associated with a first subscription and the second RF chain may be associated with a second subscription. In some aspects, the first RF chain and the second RF chain may be associated with a same band (e.g., N78 band). In some aspects, the first RF chain and the second RF chain may be associated with different bands. Bands may be inter-frequency bands and/or intra-frequency bands. In some aspects, the first RF chain may be associated with FDD and the second RF chain may be associated with FDD. In some aspects, the first RF chain may be associated with FDD and the second RF chain may be associated with TDD. In some aspects, the first RF chain may be associated with TDD and the second RF chain may be associated with TDD.

In some aspects, the baseband component may support uplink MIMO and/or uplink carrier aggregation. Uplink MIMO may support two uplink transmissions for one carrier. Uplink carrier aggregation may support one uplink transmission per carrier. The uplink MIMO and/or the uplink carrier aggregation may be configured to provide one uplink transmission per subscription (e.g., one uplink transmission may be dedicated per subscription). In other words, an uplink MIMO capability and/or an uplink carrier aggregation capability of the UE may enable uplink transmissions for two separate subscriptions. Uplink carrier aggregation, which may support two or more uplink carriers, may be leveraged to support the uplink transmissions for the two separate subscriptions.

As indicated above, FIG. 5 is provided as an example. Other examples may differ from what is described with regard to FIG. 5.

Figure 6:
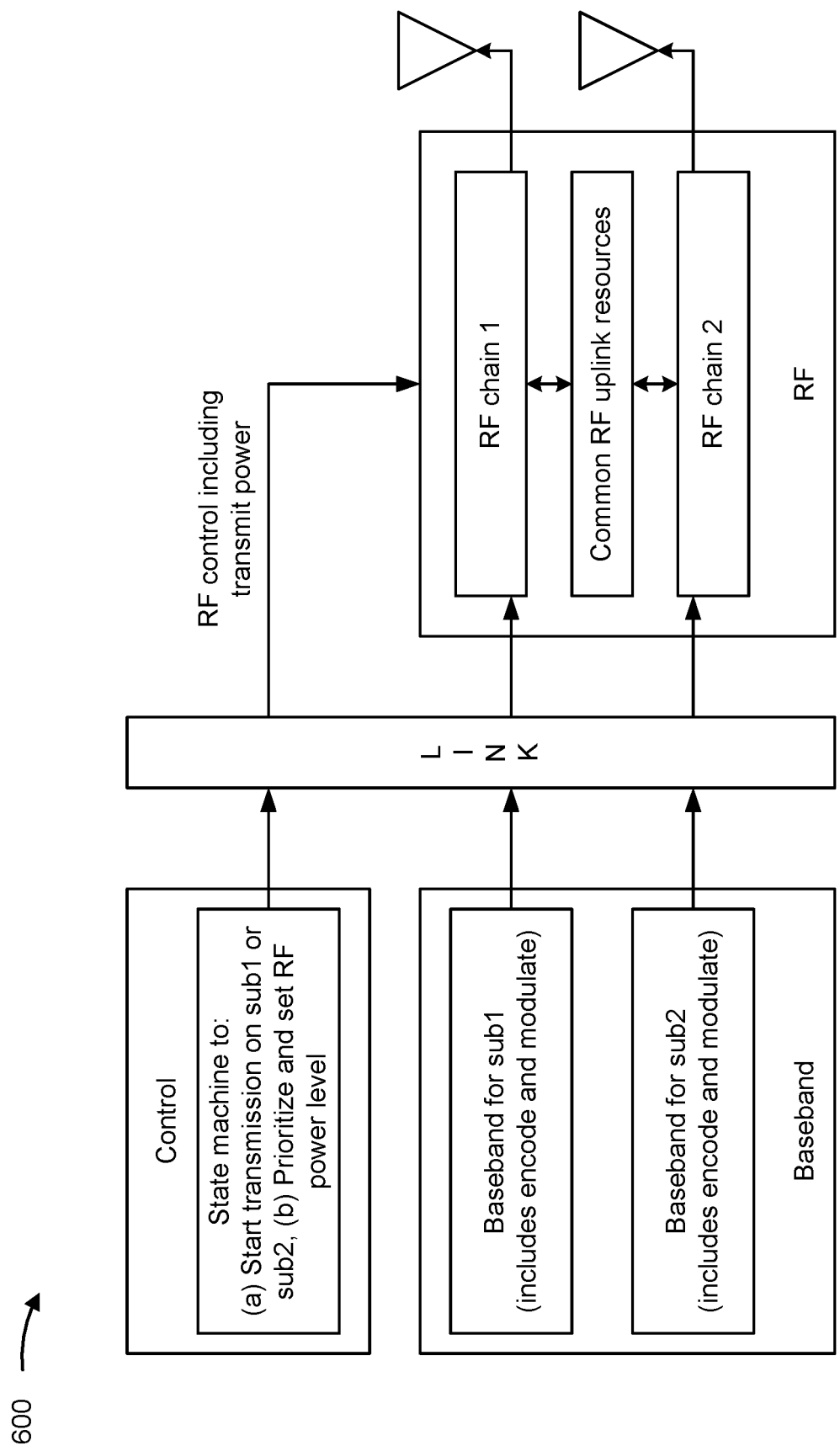

FIG. 6 is a diagram illustrating an example 600 of prioritizing uplink transmissions between subscriptions, in accordance with the present disclosure.

As shown in FIG. 6, a UE may include a control component, a baseband component, an RF component, a link to the RF component, a first antenna, and a second antenna. The control component may be associated with a state machine to start an uplink transmission on a first subscription or to start an uplink transmission on a second subscription. The state machine may prioritize and set an RF power level. In some aspects, the baseband component may include a first baseband component for the first subscription and a second baseband component for the second subscription. In some aspects, the RF component may include a first RF chain communicatively coupled to the first baseband component via a link and a second RF chain communicatively coupled to the second baseband component via the link. The first RF chain and the second RF chain may be communicatively coupled to a set of common RF uplink resources, which may include a power amplifier, a PLL, filters and other suitable components. The first RF chain may be used for the first subscription and the second RF chain may be used for the second subscription, and the set of common RF uplink resources may be used for both the first subscription and the second subscription. The RF component may receive RF control including a transmit power from the control component. The first RF chain may be communicatively coupled to a first antenna and the second RF chain may be communicatively coupled to a second antenna.

In some aspects, the control component may start an uplink transmission on the first subscription or the second subscription. In some aspects, the control component may set an uplink transmission power for the first subscription or the second subscription.

In some aspects, the baseband component may perform encoding, and modulation and filtering. The baseband component may support two or more carriers in uplink carrier aggregation. The baseband component may perform encoding including low-density parity-check (LDPC) encoding for a PUSCH transmission and polar encoding for a physical uplink control channel (PUCCH) transmission. The baseband component may perform modulation including scrambling, interleaving, precoding, and/or mapping to a constellation (e.g., 16 quadrature amplitude modulation (16-QAM) or 64-QAM). In some aspects, two or more uplink carrier aggregation carriers may be time shared or independent hardware blocks. Further, the baseband component may provision two or more baseband uplink carriers for uplink carrier aggregation, which may be used to support uplink transmissions at the UE (e.g., one uplink transmission per subscription).

As indicated above, FIG. 6 is provided as an example. Other examples may differ from what is described with regard to FIG. 6.

Figure 7:
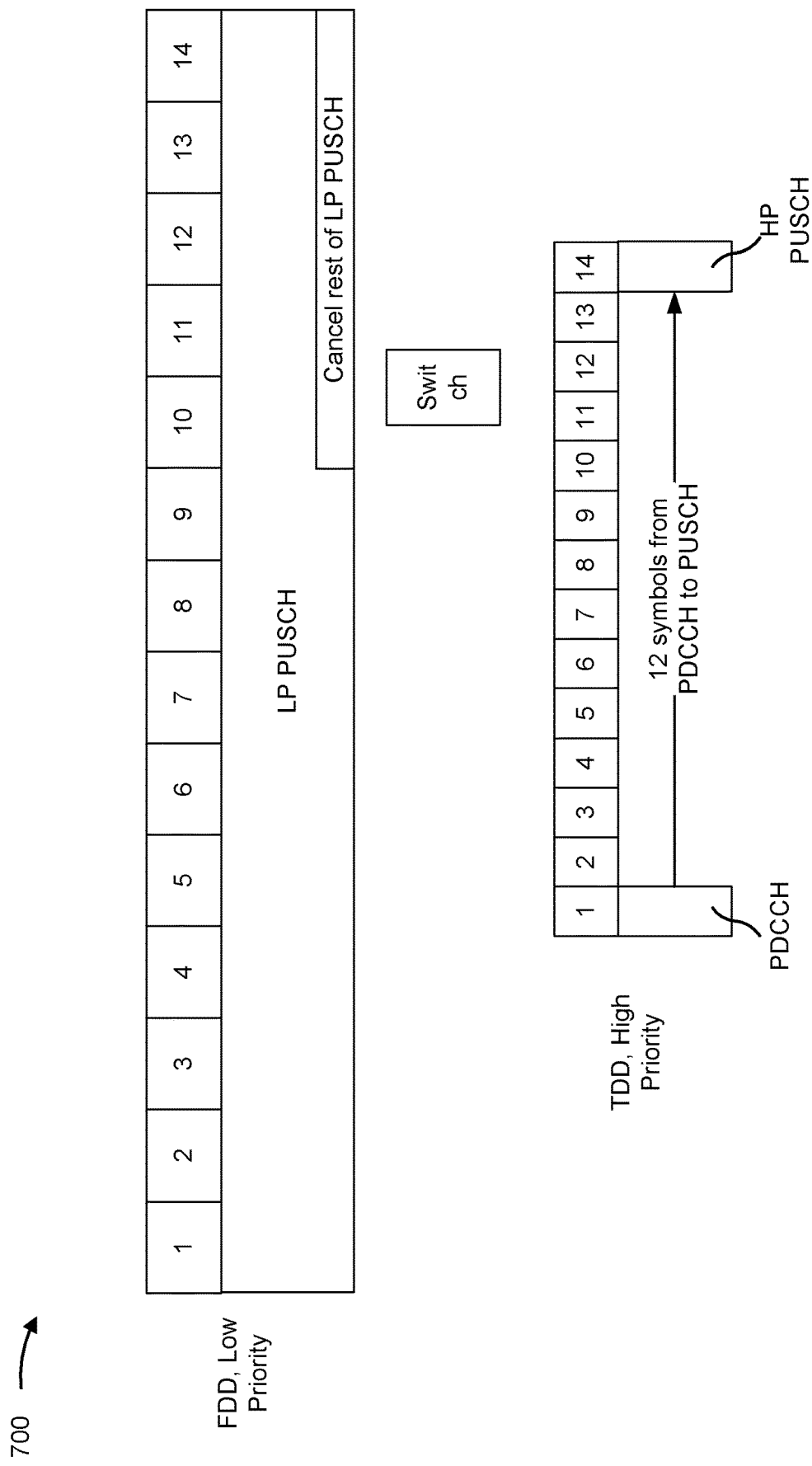

FIG. 7 is a diagram illustrating an example 700 of prioritizing uplink transmissions between subscriptions, in accordance with the present disclosure.

As shown in FIG. 7, a first RF chain of a UE may perform a first uplink transmission based at least in part on FDD. The first uplink transmission may be associated with a low priority. The first RF chain may be associated with a first subscription. The first uplink transmission may be a PUSCH transmission. While the first uplink transmission is being performed, a second RF chain of the UE may receive a PDCCH. The second RF chain may be associated with a second subscription. The PDCCH may indicate a grant for a second uplink transmission, such as a PUSCH transmission. The second uplink transmission may be based at least in part on TDD and associated with a high priority. In this case, the UE may switch from the first RF chain performing the first uplink transmission to the second RF chain. The switch from the first RF chain to the second RF chain may be relatively fast (e.g., within 100 micro seconds (μs)).

In some aspects, the first RF chain may cancel a remainder of the first uplink transmission. In other words, since the first uplink transmission may be associated with the low priority and the second uplink transmission may be associated with the high priority, after the PDCCH is received for the second uplink transmission, the remainder of the first uplink transmission may be canceled and the second uplink transmission may be performed. After the cancellation of the remainder of the first uplink transmission and the switch to the second RF chain, the second RF chain may perform the second uplink transmission associated with the high priority. A time duration between a receipt of the PDCCH and a start of the second uplink transmission (e.g., the PUSCH transmission) may be based at least in part on a minimum timeline for TDD (e.g., 12 symbols of approximately 428 μs in duration).

As indicated above, FIG. 7 is provided as an example. Other examples may differ from what is described with regard to FIG. 7.

Figure 8:
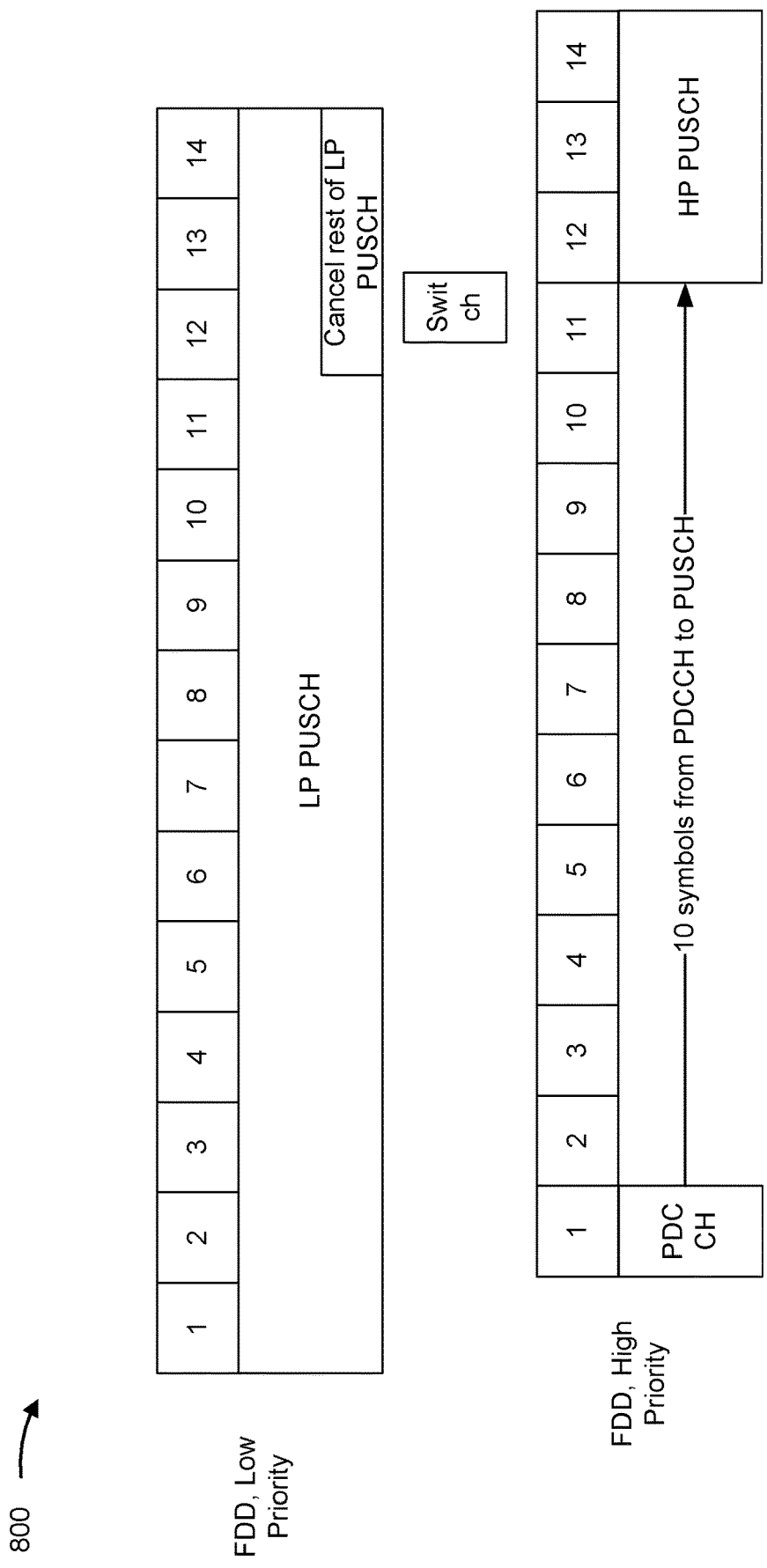

FIG. 8 is a diagram illustrating an example 800 of prioritizing uplink transmissions between subscriptions, in accordance with the present disclosure.

As shown in FIG. 8, a first RF chain of a UE may perform a first uplink transmission based at least in part on FDD. The first uplink transmission may be associated with a low priority. The first RF chain may be associated with a first subscription. The first uplink transmission may be a PUSCH transmission. While the first uplink transmission is being performed, a second RF chain of the UE may receive a PDCCH. The second RF chain may be associated with a second subscription. The PDCCH may indicate a grant for a second uplink transmission, such as a PUSCH transmission. The second uplink transmission may be based at least in part on FDD and associated with a high priority. In this case, the UE may switch from the first RF chain performing the first uplink transmission to the second RF chain. The switch from the first RF chain to the second RF chain may be relatively fast (e.g., within 100 μs).

In some aspects, the first RF chain may cancel a remainder of the first uplink transmission. In other words, since the first uplink transmission may be associated with the low priority and the second uplink transmission may be associated with the high priority, after the PDCCH is received for the second uplink transmission, the remainder of the first uplink transmission may be canceled and the second uplink transmission may be performed. After the cancellation of the remainder of the first uplink transmission and the switch to the second RF chain, the second RF chain may perform the second uplink transmission associated with the high priority. A time duration between a receipt of the PDCCH and a start of the second uplink transmission (e.g., the PUSCH transmission) may be based at least in part on a minimum timeline for FDD (e.g., 10 symbols of approximately 714 μs in duration).

As indicated above, FIG. 8 is provided as an example. Other examples may differ from what is described with regard to FIG. 8.

Figure 9:
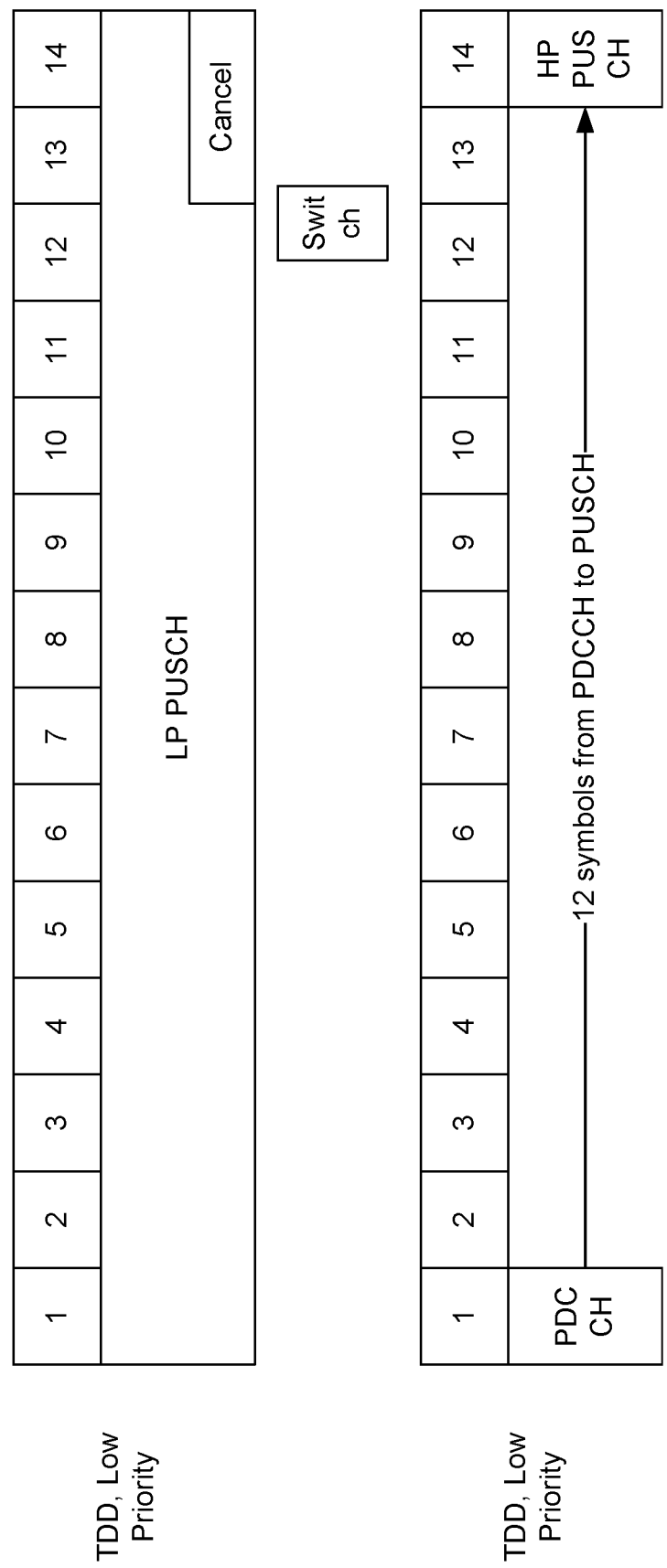

FIG. 9 is a diagram illustrating an example 900 of prioritizing uplink transmissions between subscriptions, in accordance with the present disclosure.

As shown in FIG. 9, a first RF chain of a UE may perform a first uplink transmission based at least in part on TDD. The first uplink transmission may be associated with a low priority. The first RF chain may be associated with a first subscription. The first uplink transmission may be a PUSCH transmission. While the first uplink transmission is being performed, a second RF chain of the UE may receive a PDCCH. The second RF chain may be associated with a second subscription. The PDCCH may indicate a grant for a second uplink transmission, such as a PUSCH transmission. The second uplink transmission may be based at least in part on TDD and associated with a high priority. In this case, the UE may switch from the first RF chain performing the first uplink transmission to the second RF chain. The switch from the first RF chain to the second RF chain may be relatively fast (e.g., within 100 µs).

In some aspects, the first RF chain may cancel a remainder of the first uplink transmission. In other words, since the first uplink transmission may be associated with the low priority and the second uplink transmission may be associated with the high priority, after the PDCCH is received for the second uplink transmission, the remainder of the first uplink transmission may be canceled and the second uplink transmission may be performed. After the cancellation of the remainder of the first uplink transmission and the switch to the second RF chain, the second RF chain may perform the second uplink transmission associated with the high priority. A time duration between a receipt of the PDCCH and a start of the second uplink transmission (e.g., the PUSCH transmission) may be based at least in part on a minimum timeline for TDD (e.g., 12 symbols of approximately 428 µs in duration).

As indicated above, FIG. 9 is provided as an example. Other examples may differ from what is described with regard to FIG. 9.

Figure 10:
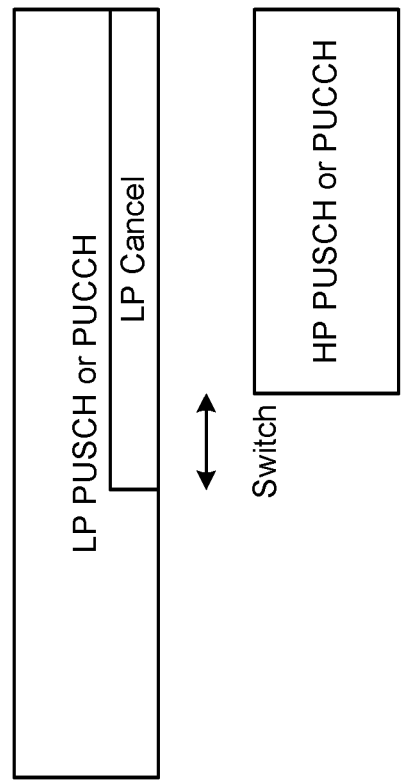

FIG. 10 is a diagram illustrating an example 1000 of prioritizing uplink transmissions between subscriptions, in accordance with the present disclosure.

As shown in FIG. 10, an ongoing low priority uplink transmission (e.g., a PUSCH transmission or a PUCCH transmission) associated with a first subscription may be canceled, and a switch may be performed to switch from the low priority uplink transmission to a high priority uplink transmission (e.g., a PUSCH transmission or a PUCCH transmission) associated with a second subscription. The high priority uplink transmission may be performed based at least in part on a PDCCH with an uplink grant. A timeline between the PDCCH with the uplink grant and a corresponding uplink symbol(s) may be relatively short in duration, such that the low priority uplink transmission may be canceled while in progress (e.g., before the low priority uplink transmission is finished) so that the corresponding uplink symbol(s) may be used to perform the high priority uplink transmission. In some aspects, a switch from the low priority uplink transmission associated with the first subscription to the high priority uplink transmission associated with the second subscription may be based at least in part on a switched uplink mechanism, or alternatively, an SRS carrier switching mechanism. The switched uplink mechanism and/or the SRS carrier switching mechanism may allow the switch to occur in a relatively short period of time (e.g., within 100 µs).

In some aspects, transmit sharing may be supported with or without canceling the low priority uplink transmission. However, without an ability to cancel the low priority uplink transmission, the uplink grant provided by the PDCCH for the high priority uplink transmission may likely occur during the low priority uplink transmission. As a result, the uplink grant may be missed due to the low priority uplink transmission, and the high priority uplink transmission may be unable to be performed. On the other hand, with the ability to cancel the low priority uplink transmission, when the uplink grant for the high priority uplink transmission occurs, the low priority uplink transmission may have already been cancelled thereby allowing the high priority uplink transmission to be performed during the uplink grant.

As indicated above, FIG. 10 is provided as an example. Other examples may differ from what is described with regard to FIG. 10.

Figure 11:
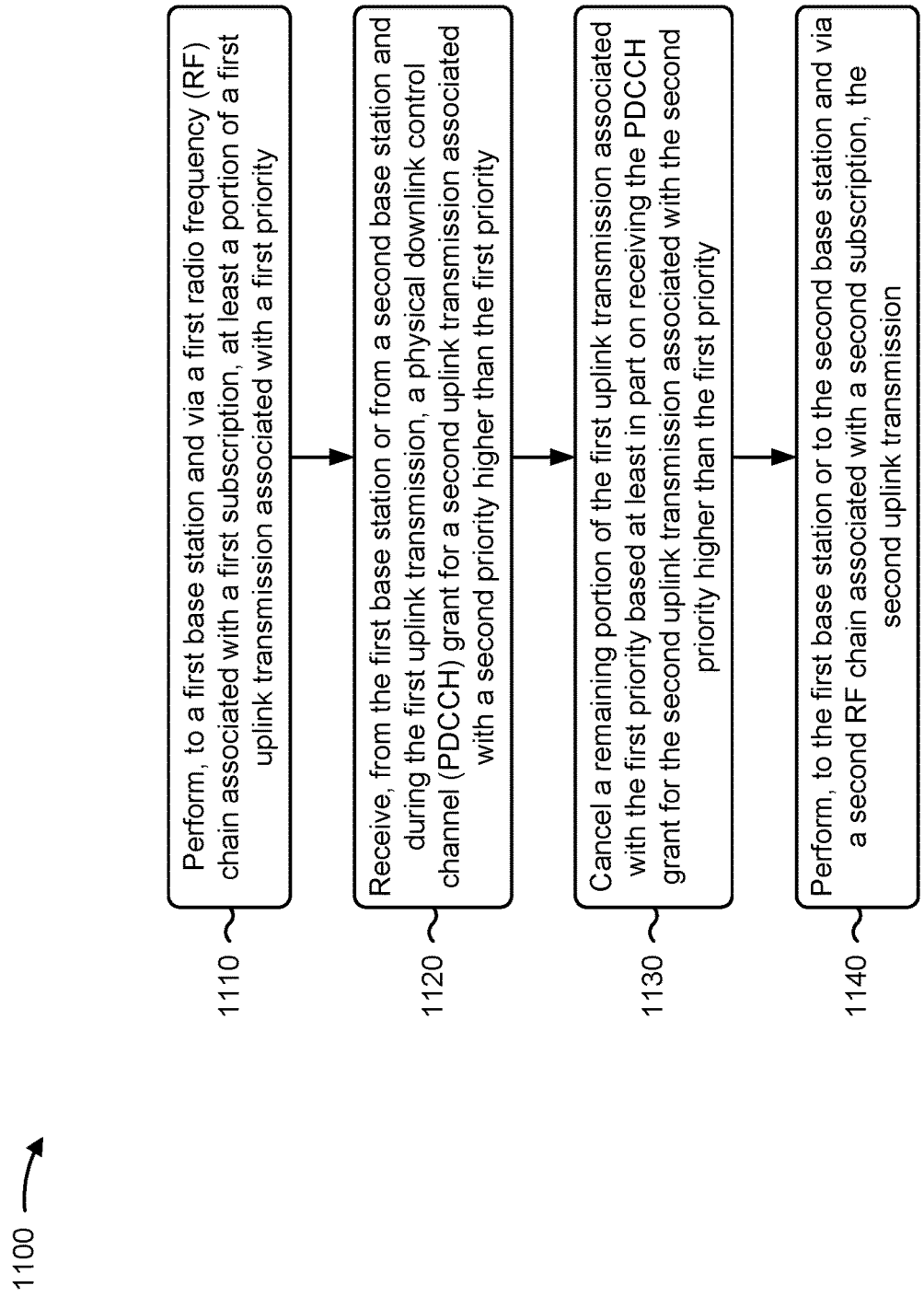
FIG. 11 is a diagram illustrating an example process associated with prioritizing uplink transmissions between subscriptions, in accordance with the present disclosure.

FIG. 11 is a diagram illustrating an example process 1100 performed, for example, by a user equipment (UE), in accordance with the present disclosure. Example process 1100 is an example where the UE (e.g., UE 120) performs operations associated with prioritizing uplink transmissions between subscriptions.

As shown in FIG. 11, in some aspects, process 1100 may include performing, to a first base station and via a first RF chain associated with a first subscription, at least a portion of a first uplink transmission associated with a first priority (block 1110). For example, the UE (e.g., using transmission component 1204, depicted in FIG. 12) may perform, to a first base station and via a first RF chain associated with a first subscription, at least a portion of a first uplink transmission associated with a first priority, as described above.

As further shown in FIG. 11, in some aspects, process 1100 may include receiving, from the first base station or from a second base station and during the first uplink transmission, a PDCCH grant for a second uplink transmission associated with a second priority higher than the first priority (block 1120). For example, the UE (e.g., using reception component 1202, depicted in FIG. 12) may receive, from the first base station or from a second base station and during the first uplink transmission, a PDCCH grant for a second uplink transmission associated with a second priority higher than the first priority, as described above.

As further shown in FIG. 11, in some aspects, process 1100 may include canceling a remaining portion of the first uplink transmission associated with the first priority based at least in part on receiving the PDCCH grant for the second uplink transmission associated with the second priority higher than the first priority (block 1130). For example, the UE (e.g., using cancelation component 1208, depicted in FIG. 12) may cancel a remaining portion of the first uplink transmission associated with the first priority based at least in part on receiving the PDCCH grant for the second uplink transmission associated with the second priority higher than the first priority, as described above.

As further shown in FIG. 11, in some aspects, process 1100 may include performing, to the first base station or to the second base station and via a second RF chain associated with a second subscription, the second uplink transmission (block 1140). For example, the UE (e.g., using transmission component 1204, depicted in FIG. 12) may perform, to the first base station or to the second base station and via a second RF chain associated with a second subscription, the second uplink transmission, as described above.

Process 1100 may include additional aspects, such as any single aspect or any combination of aspects described below and/or in connection with one or more other processes described elsewhere herein.

In a first aspect, process 1100 includes switching, based at least in part on a start of the remaining portion of the first uplink transmission that is canceled, to the second uplink transmission on the second RF chain.

In a second aspect, alone or in combination with the first aspect, the switching is based at least in part on a switched uplink mechanism.

In a third aspect, alone or in combination with one or more of the first and second aspects, the switching is based at least in part on a sounding reference signal carrier switching mechanism.

In a fourth aspect, alone or in combination with one or more of the first through third aspects, the first RF chain and the second RF chain are associated with common uplink radio frequency resources that are shared between the first RF chain and the second RF chain.

In a fifth aspect, alone or in combination with one or more of the first through fourth aspects, the first uplink transmission does not overlap in time with the second uplink transmission based at least in part on transmit sharing between the first RF chain and the second RF chain.

In a sixth aspect, alone or in combination with one or more of the first through fifth aspects, a quantity of symbols between the PDCCH grant and a start of the second uplink transmission corresponds to a minimum timeline for frequency division duplexing.

In a seventh aspect, alone or in combination with one or more of the first through sixth aspects, a quantity of symbols between the PDCCH grant and a start of the second uplink transmission corresponds to a minimum timeline for time division duplexing.

In an eighth aspect, alone or in combination with one or more of the first through seventh aspects, the first base station is associated with a first network and the second base station is associated with a second network.

In a ninth aspect, alone or in combination with one or more of the first through eighth aspects, the first subscription and the second subscription are associated with a single band.

In a tenth aspect, alone or in combination with one or more of the first through ninth aspects, the first subscription is associated with a first band and the second subscription is associated with a second band.

In an eleventh aspect, alone or in combination with one or more of the first through tenth aspects, performing the first uplink transmission and performing the second uplink transmission are based at least in part on an uplink MIMO capability of the UE, wherein the uplink MIMO capability supports two transmissions for one carrier and is configured to provide one uplink transmission per subscription.

In a twelfth aspect, alone or in combination with one or more of the first through eleventh aspects, performing the first uplink transmission and performing the second uplink transmission are based at least in part on an uplink carrier aggregation capability of the UE, wherein the uplink carrier aggregation capability supports one transmission per carrier and is configured to provide one uplink transmission per subscription.

In a thirteenth aspect, alone or in combination with one or more of the first through twelfth aspects, the first uplink transmission is based at least in part on frequency division duplexing and the second uplink transmission is based at least in part on time division duplexing.

In a fourteenth aspect, alone or in combination with one or more of the first through thirteenth aspects, the first uplink transmission is based at least in part on frequency division duplexing and the second uplink transmission is based at least in part on frequency division duplexing.

In a fifteenth aspect, alone or in combination with one or more of the first through fourteenth aspects, the first uplink transmission is based at least in part on time division duplexing and the second uplink transmission is based at least in part on time division duplexing.

In a sixteenth aspect, alone or in combination with one or more of the first through fifteenth aspects, the first uplink transmission and the second uplink transmission are associated with physical uplink shared channel transmissions.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
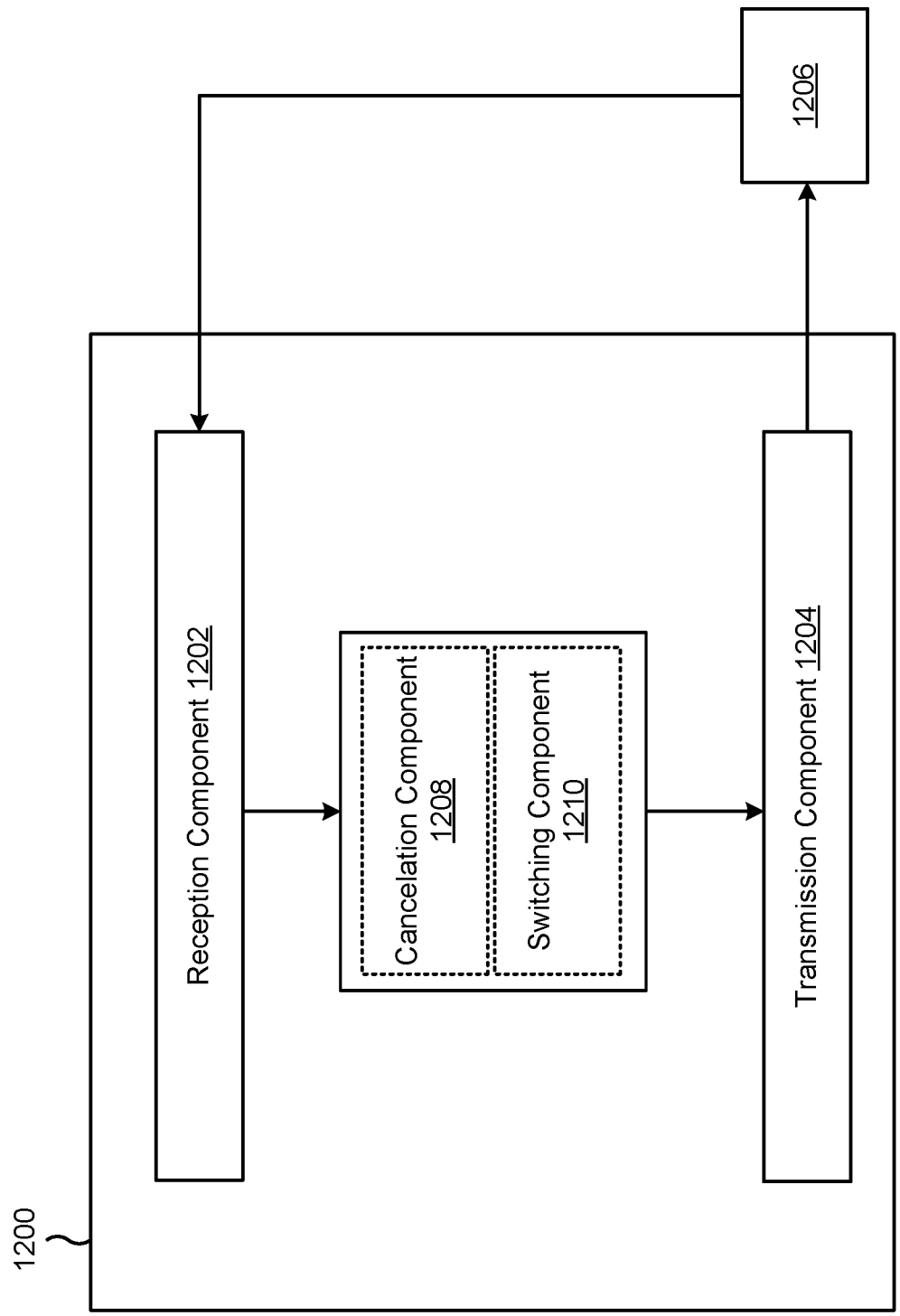
FIG. 12 is a block diagram of an example apparatus for wireless communication, in accordance with the present disclosure.

FIG. 12 is a block diagram of an example apparatus 1200 for wireless communication. The apparatus 1200 may be a UE, or a UE may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include one or more of a cancelation component 1208, or a switching component 1210, among other examples.

In some aspects, the apparatus 1200 may be configured to perform one or more operations described herein in connection with FIGS. 3-10. Additionally, or alternatively, the apparatus 1200 may be configured to perform one or more processes described herein, such as process 1100 of FIG. 11. In some aspects, the apparatus 1200 and/or one or more components shown in FIG. 12 may include one or more components of the UE described above in connection with FIG. 2. Additionally, or alternatively, one or more components shown in FIG. 12 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a demodulator, a MIMO detector, a receive processor, a controller/processor, a memory, or a combination thereof, of the UE described above in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modulator, a transmit MIMO processor, a transmit processor, a controller/processor, a memory, or a combination thereof, of the UE described above in connection with FIG. 2. In some aspects, the transmission component 1204 may be co-located with the reception component 1202 in a transceiver.

The transmission component 1204 may perform, to a first base station and via a first RF chain associated with a first subscription, at least a portion of a first uplink transmission associated with a first priority. The reception component 1202 may receive, from the first base station or from a second base station and during the first uplink transmission, a PDCCH grant for a second uplink transmission associated with a second priority higher than the first priority. The cancelation component 1208 may cancel a remaining portion of the first uplink transmission associated with the first priority based at least in part on receiving the PDCCH grant for the second uplink transmission associated with the second priority higher than the first priority. The transmission component 1204 may perform, to the first base station or to the second base station and via a second RF chain associated with a second subscription, the second uplink transmission. The switching component 1210 may switch, based at least in part on a start of the remaining portion of the first uplink transmission that is canceled, to the second uplink transmission on the second RF chain.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a user equipment (UE), comprising: performing, to a first base station and via a first radio frequency (RF) chain associated with a first subscription, at least a portion of a first uplink transmission associated with a first priority; receiving, from the first base station or from a second base station and during the first uplink transmission, a physical downlink control channel (PDCCH) grant for a second uplink transmission associated with a second priority higher than the first priority; canceling a remaining portion of the first uplink transmission associated with the first priority based at least in part on receiving the PDCCH grant for the second uplink transmission associated with the second priority higher than the first priority; and performing, to the first base station or to the second base station and via a second RF chain associated with a second subscription, the second uplink transmission.

Aspect 2: The method of Aspect 1, further comprising: switching, based at least in part on a start of the remaining portion of the first uplink transmission that is canceled, to the second uplink transmission on the second RF chain.

Aspect 3: The method of Aspect 2, wherein the switching is based at least in part on a switched uplink mechanism.

Aspect 4: The method of Aspect 2, wherein the switching is based at least in part on a sounding reference signal carrier switching mechanism.

Aspect 5: The method of any of Aspects 1 through 4, wherein the first RF chain and the second RF chain are associated with common uplink radio frequency resources that are shared between the first RF chain and the second RF chain.

Aspect 6: The method of any of Aspects 1 through 5, wherein the first uplink transmission does not overlap in time with the second uplink transmission based at least in part on transmit sharing between the first RF chain and the second RF chain.

Aspect 7: The method of any of Aspects 1 through 6, wherein a quantity of symbols between the PDCCH grant and a start of the second uplink transmission corresponds to a minimum timeline for frequency division duplexing.

Aspect 8: The method of any of Aspects 1 through 7, wherein a quantity of symbols between the PDCCH grant and a start of the second uplink transmission corresponds to a minimum timeline for time division duplexing.

Aspect 9: The method of any of Aspects 1 through 8, wherein the first base station is associated with a first network and the second base station is associated with a second network.

Aspect 10: The method of any of Aspects 1 through 9, wherein the first subscription and the second subscription are associated with a single band.

Aspect 11: The method of any of Aspects 1 through 10, wherein the first subscription is associated with a first band and the second subscription is associated with a second band.

Aspect 12: The method of any of Aspects 1 through 11, wherein performing the first uplink transmission and performing the second uplink transmission are based at least in part on an uplink multiple-input multiple-output (MIMO) capability of the UE, wherein the uplink MIMO capability supports two transmissions for one carrier and is configured to provide one uplink transmission per subscription.

Aspect 13: The method of any of Aspects 1 through 12, wherein performing the first uplink transmission and performing the second uplink transmission are based at least in part on an uplink carrier aggregation capability of the UE, wherein the uplink carrier aggregation capability supports one transmission per carrier and is configured to provide one uplink transmission per subscription.

Aspect 14: The method of any of Aspects 1 through 13, wherein the first uplink transmission is based at least in part on frequency division duplexing and the second uplink transmission is based at least in part on time division duplexing.

Aspect 15: The method of any of Aspects 1 through 14, wherein the first uplink transmission is based at least in part on frequency division duplexing and the second uplink transmission is based at least in part on frequency division duplexing.

Aspect 16: The method of any of Aspects 1 through 15, wherein the first uplink transmission is based at least in part on time division duplexing and the second uplink transmission is based at least in part on time division duplexing.

Aspect 17: The method of any of Aspects 1 through 16, wherein the first uplink transmission and the second uplink transmission are associated with physical uplink shared channel transmissions.

Aspect 18: An apparatus for wireless communication at a device, comprising a processor; memory coupled with the processor; and instructions stored in the memory and executable by the processor to cause the apparatus to perform the method of one or more Aspects of Aspects 1-17.

Aspect 19: A device for wireless communication, comprising a memory and one or more processors coupled to the memory, the one or more processors configured to perform the method of one or more Aspects of Aspects 1-17.

Aspect 20: An apparatus for wireless communication, comprising at least one means for performing the method of one or more Aspects of Aspects 1-17.

Aspect 21: A non-transitory computer-readable medium storing code for wireless communication, the code comprising instructions executable by a processor to perform the method of one or more Aspects of Aspects 1-17.

Aspect 22: A non-transitory computer-readable medium storing a set of instructions for wireless communication, the set of instructions comprising one or more instructions that, when executed by one or more processors of a device, cause the device to perform the method of one or more Aspects of Aspects 1-17.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
    one or more memories; and
    one or more processors, coupled with the one or more memories and configured to cause the UE to:
        perform, to a first base station and via a first radio frequency (RF) chain associated with a first subscription, at least a portion of a first physical uplink shared channel (PUSCH) transmission, from the UE, associated with a first priority;
        receive, from the first base station or from a second base station and during the first PUSCH transmission, a physical downlink control channel (PDCCH) grant for a second PUSCH transmission to be transmitted from the UE, wherein the second PUSCH transmission is associated with a second priority higher than the first priority;
        cancel a remaining portion of the first PUSCH transmission, from the UE, associated with the first priority based at least in part on receiving the PDCCH grant for the second PUSCH transmission; and
        perform, to the first base station or to the second base station and via a second RF chain associated with a second subscription, the second PUSCH transmission from the UE.

2. The apparatus of claim 1, wherein the one or more processors are further configured to:
    switch, based at least in part on a start of the remaining portion of the first PUSCH transmission that is canceled, to the second PUSCH transmission on the second RF chain, wherein:
        the switch to the second PUSCH transmission on the second RF chain is based at least in part on a switched PUSCH mechanism; or
        the switch to the second PUSCH transmission on the second RF chain is based at least in part on a sounding reference signal carrier switching mechanism.

3. The apparatus of claim 1, wherein the first RF chain and the second RF chain are associated with common PUSCH radio frequency resources that are shared between the first RF chain and the second RF chain.

4. The apparatus of claim 3, where the common PUSCH radio frequency resources comprise one or more of one or more amplifiers, one or more phase-locked loops (PLLs), or one or more filters.

5. The apparatus of claim 1, wherein the first PUSCH transmission does not overlap in time with the second PUSCH transmission based at least in part on transmit sharing between the first RF chain and the second RF chain.

6. The apparatus of claim 1, wherein a quantity of symbols between the PDCCH grant and a start of the second PUSCH transmission corresponds to a minimum timeline for frequency division duplexing.

7. The apparatus of claim 1, wherein a quantity of symbols between the PDCCH grant and a start of the second PUSCH transmission corresponds to a minimum timeline for time division duplexing.

8. The apparatus of claim 1, wherein the first base station is associated with a first network and the second base station is associated with a second network.

9. The apparatus of claim 1, wherein:
the first subscription and the second subscription are associated with a single band; or
the first subscription is associated with a first band and the second subscription is associated with a second band.

10. The apparatus of claim 1, wherein the one or more processors are configured to perform the first PUSCH transmission and perform the second PUSCH transmission based at least in part on an uplink carrier aggregation capability of the UE, wherein the uplink carrier aggregation capability supports one transmission per carrier and is configured to provide one uplink transmission per subscription.

11. The apparatus of claim 1, wherein the one or more processors are configured to perform the first PUSCH transmission and perform the second PUSCH transmission based at least in part on an uplink multiple-input multiple-output (MIMO) capability of the UE, wherein the uplink MIMO capability supports two transmissions for one carrier and is configured to provide one uplink transmission per subscription.

12. The apparatus of claim 1, wherein the first PUSCH transmission is based at least in part on frequency division duplexing and the second PUSCH transmission is based at least in part on time division duplexing.

13. The apparatus of claim 1, wherein the first PUSCH transmission is based at least in part on frequency division duplexing and the second PUSCH transmission is based at least in part on frequency division duplexing.

14. The apparatus of claim 1, wherein the first PUSCH transmission is based at least in part on time division duplexing and the second PUSCH transmission is based at least in part on time division duplexing.

15. The apparatus of claim 1, wherein the first subscription is associated with a first uplink transmission power and the second subscription is associated with a second uplink power.

16. A method of wireless communication performed by a user equipment (UE), comprising:
performing, to a first base station and via a first radio frequency (RF) chain associated with a first subscription, at least a portion of a first physical uplink shared channel (PUSCH) transmission, from the UE, associated with a first priority;
receiving, from the first base station or from a second base station and during the first PUSCH transmission, a physical downlink control channel (PDCCH) grant for a second PUSCH transmission to be transmitted from the UE, wherein the second PUSCH transmission is associated with a second priority higher than the first priority;
canceling a remaining portion of the first PUSCH transmission, from the UE, associated with the first priority based at least in part on receiving the PDCCH grant for the second PUSCH transmission; and
performing, to the first base station or to the second base station and via a second RF chain associated with a second subscription, the second PUSCH transmission from the UE.

17. The method of claim 16, further comprising:
switching, based at least in part on a start of the remaining portion of the first PUSCH transmission that is canceled, to the second PUSCH transmission on the second RF chain, wherein:
the switching is based at least in part on a switched uplink mechanism; or
the switching is based at least in part on a sounding reference signal carrier switching mechanism.

18. The method of claim 16, wherein the first RF chain and the second RF chain are associated with common uplink radio frequency resources that are shared between the first RF chain and the second RF chain.

19. The method of claim 16, wherein the first PUSCH transmission does not overlap in time with the second PUSCH transmission based at least in part on transmit sharing between the first RF chain and the second RF chain.

20. The method of claim 16, wherein a quantity of symbols between the PDCCH grant and a start of the second PUSCH transmission corresponds to a minimum timeline for frequency division duplexing.

21. The method of claim 16, wherein a quantity of symbols between the PDCCH grant and a start of the second PUSCH transmission corresponds to a minimum timeline for time division duplexing.

22. The method of claim 16, wherein the first base station is associated with a first network and the second base station is associated with a second network.

23. The method of claim 16, wherein:
the first subscription and the second subscription are associated with a single band; or
the first subscription is associated with a first band and the second subscription is associated with a second band.

24. The method of claim 16, wherein performing the first PUSCH transmission and performing the second PUSCH transmission are based at least in part on an uplink multiple-input multiple-output (MIMO) capability of the UE, wherein the uplink MIMO capability supports two transmissions for one carrier and is configured to provide one uplink transmission per subscription.

25. The method of claim 16, wherein performing the first PUSCH transmission and performing the second PUSCH transmission are based at least in part on an uplink carrier aggregation capability of the UE, wherein the uplink carrier aggregation capability supports one transmission per carrier and is configured to provide one uplink transmission per subscription.

26. The method of claim 16, wherein the first PUSCH transmission is based at least in part on frequency division duplexing and the second PUSCH transmission is based at least in part on time division duplexing.

27. The method of claim 16, wherein the first PUSCH transmission is based at least in part on frequency division duplexing and the second PUSCH transmission is based at least in part on frequency division duplexing.

28. The method of claim 16, wherein the first PUSCH transmission is based at least in part on time division duplexing and the second PUSCH transmission is based at least in part on time division duplexing.

29. An apparatus for wireless communication, comprising:
- means for performing, to a first base station and via a first radio frequency (RF) chain associated with a first subscription, at least a portion of a first physical uplink shared channel (PUSCH) transmission, from the apparatus, associated with a first priority;
- means for receiving, from the first base station or from a second base station and during the first PUSCH transmission, a physical downlink control channel (PDCCH) grant for a second PUSCH transmission to be transmitted from the apparatus, wherein the second PUSCH transmission is associated with a second priority higher than the first priority;
- means for canceling a remaining portion of the first PUSCH transmission, from the apparatus associated with the first priority based at least in part on receiving the PDCCH grant for the second PUSCH transmission; and
- means for performing, to the first base station or to the second base station and via a second RF chain associated with a second subscription, the second PUSCH transmission from the apparatus.

* * * * *